Figure 1:
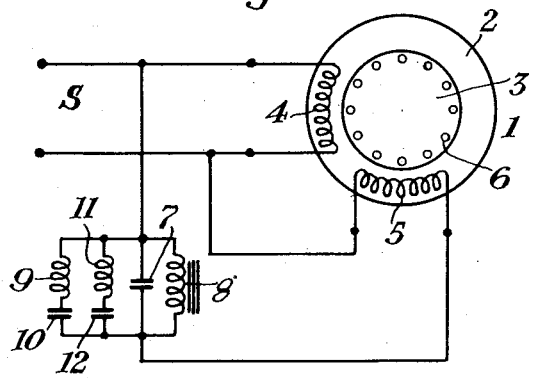

April 21, 1942.   S. A. STEVENS ET AL   2,280,456
CONVERSION OF SINGLE-PHASE ALTERNATING ELECTRIC
CURRENTS TO POLYPHASE CURRENTS
Filed Oct. 9, 1940

INVENTOR
Sydney Arthur Stevens &
Alec Hervey Bennett Walker.
BY
THEIR ATTORNEY

Patented Apr. 21, 1942

2,280,456

UNITED STATES PATENT OFFICE 2,280,456

CONVERSION OF SINGLE-PHASE ALTERNATING ELECTRIC CURRENTS TO POLYPHASE CURRENTS

Sydney Arthur Stevens and Alec Hervey Bennett Walker, London, England, assignors, by mesne assignments, to The Union Switch and Signal Company, Swissvale, Pa., a corporation of Pennsylvania Application October 9, 1940, Serial No. 360,398
In Great Britain October 16, 1939

3 Claims. (Cl. 172—246)

This invention relates to the conversion of single phase alternating electric currents to polyphase currents and is an improvement in or modification of our invention for which Letters Patent of the United States were granted on the 19th day of August, 1941 and numbered 2,253,053, for which we were the applicants.

The invention of the main application above referred to is based on the possibility of obtaining, from a single phase alternating current source, a number of alternating currents displaced in phase from one another, by providing inductances and capacities so connected to the single phase source as to advance and retard respectively the phases of the voltages developed across these elements.

As explained in the specification of our main application, a simple arrangement of this character is extremely unstable and the voltages, displaced in phase, impressed upon the load circuit are considerably varied with alteration of load.

Accordingly, arrangements are provided for automatically limiting and stablising the voltage obtaining across each of the inductance and capacity elements, this action being preferably effected in the case of the inductance by providing its winding with a magnetic core which is designed to be magnetically saturated in a predetermined manner as the load varies and in the case of the capacity by connecting a choke coil or its equivalent having a core adapted to be similarly saturated across the terminals of the capacity.

The specification of our main application describes and illustrates various circuit arrangements for effecting the conversion of single phase alternating currents to three phase currents and according to the present invention, the same principle is applied to the conversion of single phase alternating currents to two phase currents.

According to the present invention, one phase element of the two phase load circuit is connected directly or through a suitable transformer across the single phase supply circuit, the other phase element of the load circuit being connected across the supply circuit in series with a suitable condenser, a reactance having a magnetic core which is designed to be magnetically saturated in a predetermined manner as the load varies being connected across the condenser or the phase element of the load connected in series with the condenser or across each of these portions of the circuit.

Figure 2:
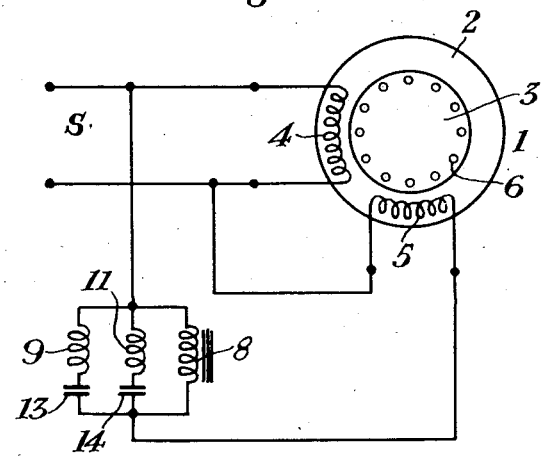

The invention is illustrated by way of example in the accompanying drawings of which Figure 1 is a diagrammatic view showing the invention applied to a two phase load circuit constituted by an electric motor of the so-called "single phase capacitor" type, Figure 2 being a similar view of a modified arrangement.

Referring now first to Figure 1 it will be seen that the single phase alternating current supply circuit is indicated at S, the load circuit consisting of a single phase capacitor motor 1 which is essentially a two phase motor and comprises a stator 2 and a rotor 3. The stator 2 is provided with two phase windings 4, 5 of which the winding 4 (hereinafter termed the "in phase" winding) is connected directly across the conductors of the supply circuit S. The other phase winding 5 (hereinafter termed the "quadrature" winding) is connected across the conductors of the supply circuit S in series with a condenser 7 of suitable capacity. The rotor 3 of the motor 1 is provided with the usual short-circuited winding 6.

A reactance 8 having a magnetic core designed to begin to be magnetically saturated at the normal working voltage obtaining across the condenser 7 is connected in parallel with the condenser.

Since the core of the reactance 8 is necessarily operated at a somewhat high flux density, the wave form of the magnetising current traversing the winding of the reactance 8 is considerably distorted from the sine wave form and thus tends to cause the wave form of the voltage across the terminals of the winding of the reactance 8 and impressed upon the quadrature winding 5 of the motor 1 to be correspondingly distorted. Furthermore, if the components of harmonic frequencies of this magnetising current are required to be supplied from the supply circuit S, the power-factor of the load constituted by the motor 1 is seriously reduced since these harmonic components are wattless.

In order to avoid these disadvantages, shunt circuits which are resonant at the harmonic frequencies are provided connected in parallel with the condenser 7. As shown in Figure 1, a shunt circuit comprising a reactance 9 and a condenser 10 connected in series and adapted to be resonant at the frequency of the third harmonic is provided together with a similar circuit comprising a reactance 11 and a condenser 12 adapted to be resonant at the frequency of the fifth harmonic.

These shunt circuits serve to provide a low impedance path for the watt less third and fifth harmonic components of the magnetising current traversing the winding of the reactance 8 so that the voltage impressed upon the quadrature winding 5 of the motor 1 is of substantially sine wave form.

It will be understood that if desired, similar shunt circuits may be provided for the higher harmonic frequency components.

In operation, the reactance 8 tends to maintain the proper quadrature relation of the phase of the voltage applied to the winding 5 of the motor 1 relative to the phase of the voltage applied to the winding 4.

Referring now to the modified arrangement shown in Figure 2, the condenser 7 as a single element of the system is omitted, the function of this condenser being performed by one or more of the condensers comprised in the shunt circuits. One of the shunt paths may, for example, comprise a reactance 9 and a condenser 13 connected in series with one another, the condenser 13 constituting with the reactance 9 a circuit resonant at the frequency of the third harmonic while as regards the fundamental frequency the condenser 13 performs a part of the function of the condenser 7 of the system of Figure 1. Similarly, another shunt circuit comprises a reactance 11 connected in series with a condenser 14, which, with the reactance 11, constitutes a circuit which is resonant at the frequency of the fifth harmonic, the condenser 14 performing the remainder of the function of the condenser 7 of Figure 1 as regards the fundamental frequency.

It will be understood that the reactance 8 above described may be connected in parallel with the quadrature winding 5 of the motor 1 instead of in parallel with the condenser 7, or suitable reactances may be connected in parallel with each of the elements 5 and 7.

The invention is evidently applicable to all two phase load circuits arranged to be supplied with operating currents from a single phase source of alternating current by means of circuit connections of the two phase elements of the load as above described.

Having now described our invention, what we claim as new and desire to secure by Letters Patent is:

1. In combination with a single phase source of alternating current, a two phase load having one phase energized from said source, a condenser for split-phasing the current in the other phase of said load, said other phase being energized from said source through said condenser in series, a saturable reactor connected across said condenser and designed to become magnetically saturated at a predetermined value of voltage across its terminals as determined by the current in said other phase, and a resonant circuit connected across said condenser and reactor combination, said resonant circuit being tuned to a frequency which is a harmonic of the frequency of said source for providing a low impedance path for current of said harmonic frequency due to saturation of said reactor, for improving the wave form of the current supplied to said other phase.

2. In combination with a single phase source of alternating current, a two phase load having one phase energized from said source, a condenser for split-phasing the current in the other phase of said load, said other phase being energized from said source through said condenser in series, a resonating reactor connected into the circuit of said condenser for resonating the condenser and reactor combination to a frequency which is a harmonic of the frequency of said source, and a saturable reactor connected across said condenser and reactor combination and designed to become magnetically saturated at a predetermined value of voltage across its terminals as determined by the current in said other phase, whereby said condenser performs both the split-phasing function and also the resonating function for current of said harmonic frequency due to saturation of said saturable reactor.

3. In combination with a single phase source of alternating current, a two phase load having one phase energized from said source, a first and a second condenser connected in parallel with each other for split-phasing the current in the other phase of said load, said other phase being energized from said source through said parallel condenser combination in series, a first resonating reactor connected into the circuit branch which contains said first condenser for resonating this circuit branch to a frequency which is a given harmonic of the frequency of said source, a second resonating reactor connected into the other circuit branch which contains said second condenser for resonating said other circuit branch to a frequency which is a different harmonic of the frequency of said source, and a saturable reactor connected across both said condenser and reactor circuit branches and designed to become magnetically saturated at a predetermined value of voltage across its terminals as determined by the current in said other phase, whereby said two condensers together perform both the split-phasing function and also the resonating function for currents of said two harmonic frequencies due to saturation of said saturable reactor.

SYDNEY ARTHUR STEVENS.
ALEC HERVEY BENNETT WALKER.